UNITED STATES PATENT OFFICE.

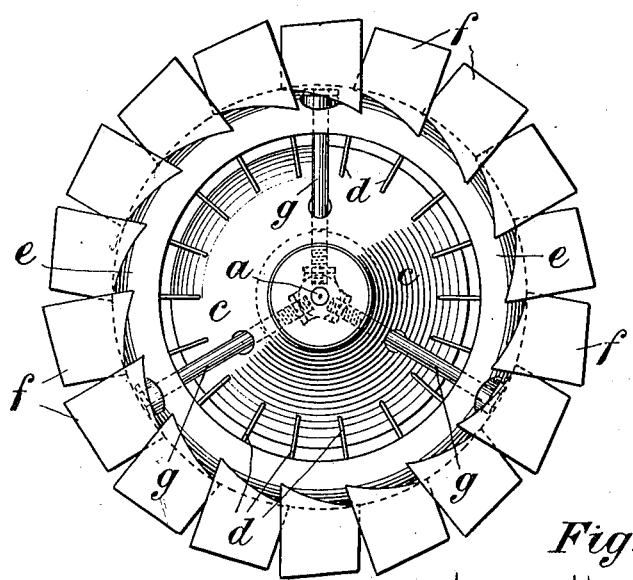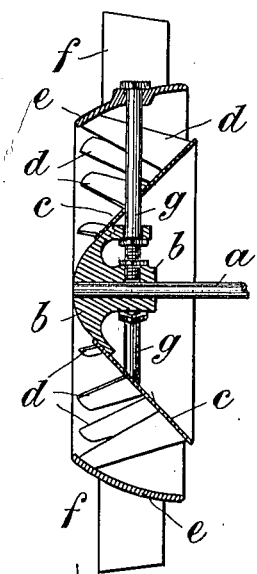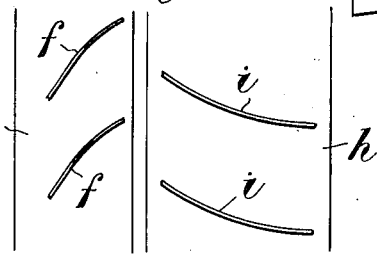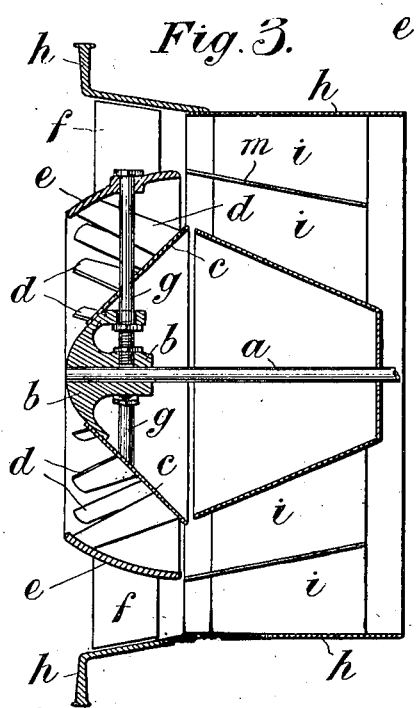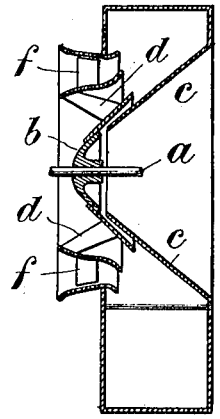

OSWALD STOTT, OF BIRMINGHAM, ENGLAND.

ROTARY FAN.

1,261,457.   Specification of Letters Patent.   Patented Apr. 2, 1918.

Application filed January 22, 1917. Serial No. 143,764.

*To all whom it may concern:*

Be it known that I, OSWALD STOTT, a subject of the King of Great Britain, residing at Ruskin Chambers, Corporation street, Birmingham, England, have invented certain new and useful Improvements in or Relating to Rotary Fans, of which the following is a specification.

My invention consists of the improvements hereinafter described in or relating to rotary fans, the said improvements having for their principal object to obtain increased efficiency in the said fans.

In order that my invention may be the better understood I remark that it is known to those conversant with rotary fans that with fans of the type technically known as screw propeller fans, with a constant rate of rotation, the driving power for the fan must be increased as the outlet or discharge opening is diminished and with fans of the type known as centrifugal fans the driving power required is decreased under the same conditions.

My invention consists in combining fans of the two types referred to so as to obtain a composite runner in which the air from the one fan does not pass through or enter the blades of the other fan and whereby the following advantages among others are obtained as a result of the opposing characteristics hereinbefore referred to of the said two types of fans.

The power required for running the composite fan is more nearly preserved constant for varying degrees of opening of outlet than with either type of fan used separately. Further, by combining the two types of runners or fans and arranging the centrifugal fan within the screw or propeller fan, that is to say, nearer the axis of the composite runner than the screw or propeller fan a larger volume of air may be displaced than would be the case if a screw or propeller fan only were used.

I will further describe my invention in connection with the accompanying drawing.

Figure 1 represents in front elevation, and Fig. 2 in vertical section a composite fan or runner constructed according to my invention.

Fig. 3 represents in section the said composite runner in a casing provided with diffuser vanes.

Fig. 4 represents diagrammatically the relative direction of the blades of the screw or propeller part of the composite runner and the diffuser vanes of the fan casing.

Fig. 5 represents in diagrammatic section my new or improved composite fan or runner arranged in a single inlet volute casing.

The same letters of reference indicate the same parts in the several figures of the drawing.

*a* is the runner shaft and *b* the hub or boss of the runner which is keyed to the said shaft, the said boss *b* having fixed thereto the cone shaped disk *c* to which the inner ends of the blades *d* of the centrifugal fan part of the runner are fixed, the outer ends of the said blades being attached to a ring *e* having on its outer side or periphery the screw or propeller blades *f*. The ring *e* is connected to the boss *b* by stay rods or spokes *g* in any convenient way.

The direction of the blades *d* of the centrifugal part of the composite runner is parallel with the axis of the runner as is usual in a centrifugal fan, but the blades may be radial, or inclined or curved or may be partly curved and partly flat.

The air which is discharged from the tips of the blades of the centrifugal portion of the composite runner is guided by the concave surface or inner side of the ring *e* and made to take a direction similar to that of the air discharged from the inner edges of the screw or propeller blades *f* of the composite runner.

To obtain the highest efficiencies from the new or improved composite runner described it is arranged in a casing *h* (see Fig. 3) having within its inner end or part diffuser blades *i*.

It may be found necessary or desirable to give to the parts of the diffuser vanes which receive the air from the screw or propeller blades a different inclination or shape from the parts of the said vanes which receive the air from the centrifugal fan blades.

The vanes will preferably be provided with an annular partition or ring *m* between the casing *h* and the inner drum to which the inner ends of the vanes are fixed.

If desired the composite runner may be arranged in a single inlet volute casing as is illustrated diagrammatically in Fig. 5, or one of the said runners may be arranged in each of the two inlet openings of a double inlet volute casing.

I wish it to be understood that two or more of my new or improved composite runners may be used in series, or the said composite runner may be used in combination with runners of other constructions.

I claim:—

1. A rotary fan or runner consisting of the combination of a series of centrifugal fan blades and a series of screw or propeller fan blades, the centrifugal blades being arranged within and separated from the said propeller blades that the air from the one does not pass through or enter the blades of the other.

2. A composite fan comprising a shaft, a conical disk mounted on the shaft and having a series of centrifugal fan blades projecting outwardly therefrom, and a ring surrounding and secured to the ends of said blades and having outwardly projecting propeller blades.

3. A composite fan comprising a shaft having a boss thereon, a conical disk secured to the boss and having centrifugal blades projecting outwardly therefrom, a ring surrounding and secured to the ends of said blades and having outwardly projecting propeller blades, and stay devices between the said boss and ring.

4. A composite fan comprising a shaft, a conical disk mounted on the shaft and having a series of centrifugal blades projecting outwardly therefrom, a ring surrounding and secured to the ends of said blades and having outwardly projecting propeller blades, and a casing surrounding said fan and propeller blades and having diffuser blades therein.

5. A composite fan comprising a shaft, a conical disk mounted on the shaft and having a series of centrifugal blades projecting outwardly therefrom, a ring surrounding and secured to the ends of said blades and having outwardly projecting propeller blades, a casing surrounding said centrifugal and propeller blades, a drum within the casing having diffuser vanes, and an annular partition between the drum and casing.

In testimony whereof I have hereunto set my hand.

OSWALD STOTT.